United States Patent [19]

Fournier et al.

[11] Patent Number: 5,129,423
[45] Date of Patent: Jul. 14, 1992

[54] NO-SPILL FLUID SECURITY COUPLING

[75] Inventors: Paul J. E. Fournier, Jackson; Randolph L. Maiville, Onondaga; Donald G. McCracken, Horton, all of Mich.

[73] Assignee: Aeroquip Corporation, Maumee, Ohio

[21] Appl. No.: 494,644

[22] Filed: Mar. 16, 1990

[51] Int. Cl.$^5$ .............................................. F16L 37/28
[52] U.S. Cl. ......................... 137/614.05; 137/614.17; 137/322
[58] Field of Search ............... 137/329.1, 329.2, 329.3, 137/329.4, 614.03, 614.05, 614.17, 614.19, 588, 322

[56] References Cited

U.S. PATENT DOCUMENTS

| | | | |
|---|---|---|---|
| 2,620,817 | 12/1952 | Blaydes | 137/322 |
| 2,632,462 | 3/1953 | Selwyn | 137/322 |
| 2,905,487 | 9/1959 | Schifler | 137/329.1 |
| 3,985,156 | 10/1976 | Walker | 137/588 |
| 4,009,729 | 3/1977 | Vile | 137/614.19 |
| 4,123,089 | 10/1978 | Viero et al. | 137/614.19 |
| 4,527,587 | 11/1987 | Fairlamb | 137/614.19 |
| 4,703,774 | 11/1987 | Seehausen | 137/614.17 |

FOREIGN PATENT DOCUMENTS 103116 6/1898 Fed. Rep. of Germany ...... 137/322

Primary Examiner—A. Michael Chambers

[57] ABSTRACT

A no-spill fluid security system for couplings for use with fluids producing environmental impact wherein the coupling permits unidirectional flow for consumer use and bidirectional flow to permit the refilling of containers with specially designed mating coupling parts. The primary coupling part includes a valve located adjacent the primary part end to prevent spillage and a normally operative check valve prevents fluid flow into the primary coupling part while a secondary coupling part of special construction opens the normally closed check valve permitting unidirectional flow through the primary part. Pressure relief means are incorporated into the primary part to permit trapped fluids within an uncoupled primary part to be bled into the associated receptacle upon a predetermined pressure existing to prevent spillage.

35 Claims, 7 Drawing Sheets

NO-SPILL FLUID SECURITY COUPLING

BACKGROUND OF THE INVENTION

Many fluid chemical products used in industry, agriculture, and by consumers have a negative environmental impact if not properly used, stored, applied, handled and shipped. Many of such fluid chemical products which are potentially environmentally hazardous are stored and shipped in expensive closed containers specially designed to safely enclose the fluid and such containers, such as those used with agricultural fertilizers, are leased or rented by the consumer with the intention of the container being returned to an authorized dealer for refill. However, because of the high quality of the container consumers sometimes retain the containers for use for other purposes than which they were intended, and the containers may be refilled with fluids other than that for which they were designed, or originally contained.

As the manufacturer of chemical fluid products shipped in such containers may ultimately be held liable for damages arising from improper refilling of such containers and receptacles concern exists that the unauthorized refilling of containers originally used with fluid having an environmental impact may result in bodily harm or severe environmental damage. Many fluid chemicals shipped in containers may become explosive, or highly pressurized, if mixed with other agents improperly introduced into the container and fluid security systems preventing such occurrences have not been available which are practical and feasible.

A particular instance wherein fluid security of the aforedescribed type is highly desirable is with agriculture products wherein the farmer consumer rents or leases a container of fluid chemical fertilizer or cleaner, and the consumer attaches a coupling to the container coupling to permit the desired dispensing of the fluid. Thus, the consumer will have a coupling compatible to the fluid container coupling and the consumer will have the equipment by which fluids could be introduced into the container unless the container coupling prevents such occurrence. Heretofore, security couplings which permit authorized container refill have not been practical in that fluid flow therethrough is necessary to permit the authorized dispensing of the fluid chemical from the container by the consumer and although the use of a simple check valve prevents refilling by the consumer such a check valve also prevents an authorized dealer for the fluid chemical from refilling the container.

It is also necessary that couplings used with fluids having adverse environmental impact not spill or release the fluids except when intended, and complicated couplings using a plurality of valves, including a check valve, will trap fluid within the coupling body itself which may become highly pressurized due to environmental heat causing such confined fluid to leak from the coupling into the atmosphere and surrounding ground.

It is an object of the invention to provide a no-spill fluid security coupling system which is relatively economical to manufacture, concise, automatic and foolproof permitting unidirectional flow through a coupling part during dispensing and preventing unauthorized bidirectional coupling flow.

Another object of the invention is to provide a no-spill fluid security coupling system of economical construction wherein a primary coupling selectively receives secondary couplings, such secondary couplings being either of the consumer type permitting unidirectional flow for consumers use, or permitting bidirectional flow by authorized personnel employing a secondary coupling part different than that employed by the consumer.

Yet another object of the invention is to provide a no-spill fluid security coupling system employing a primary coupling part and "consumer" and "dealer" secondary coupling parts of different construction wherein attachment of the consumer part to the primary coupling part permits only unidirectional flow from the primary part, and the dealer coupling part permits bidirectional fluid flow through the primary part permitting receptacles associated with the primary part to be refilled.

A further object of the invention is to provide a no-spill fluid security coupling system employing a primary receptacle coupling part selectively connectable to consumer and dealer secondary coupling parts, the secondary coupling parts automatically controlling the primary coupling part for unidirectional or bidirectional flow therethrough.

Another object of the invention is to provide a no-spill fluid security coupling system wherein coupling parts may be interconnected by relative axial movement, and only axial movement is required to achieve the security operation of a plurality of valves within the primary coupling part selectively preventing bidirectional fluid flow through the primary part.

Yet another object of the invention is to provide a no-spill fluid security coupling associated with a receptacle wherein a plurality of axially spaced valves are located within the coupling part and fluid trapped between the valves is automatically discharged to the receptacle upon a predetermined fluid pressure existing in the trapped fluid.

BRIEF DESCRIPTION OF THE INVENTION

The no-spill fluid security system in accord with the invention basically consists of a primary coupling part in fluid communication with a receptacle which is not to be refilled by unauthorized personnel, secondary coupling parts selectively connectable to the primary part by either the consumer or authorized personnel are of different configurations to automatically permit either unidirectional or bidirectional fluid flow through the primary part.

The primary part includes a pair of valves. One valve is located adjacent the discharge end of the primary part preventing fluid from inadvertently flowing therefrom and preventing spillage from the primary part. The second valve constitutes a check valve limiting fluid flow through the primary part in a direction permitting fluid to be dispensed therethrough. The secondary coupling parts of both the consumer and authorized dealer versions include valve operating means for opening the primary part valve adjacent its outlet end, but only the authorized secondary coupling part includes an operator for rendering the primary part check valve inoperative to permit bidirectional flow therethrough.

Authorized bidirectional flow through the primary part is achieved by employing a ball type check valve which seats by gravity to prevent inwardly flow into the primary part. Upon connecting the authorized secondary part to the primary part the ball check valve seat structure is axially displaced to permit an abutment to unseat the ball rendering the check valve inoperative and bidirectional. Springs are associated with both of the primary part valves to restore the valves to their operative conditions upon uncoupling the secondary coupling part.

Fluid may become trapped between the primary part valves, and environmental heating of this fluid, such as by the sun, may produce high pressures therein which may cause the fluid to leak past the primary part sealing valve and permit the fluid to escape to the atmosphere or area surrounding the coupling part. This occurrence is prevented in accord with the inventive concepts as an increase in trapped pressure fluid displaces the primary part check valve to its inoperative condition permitting the pressurized fluid to bleed back into the receptacle prior to pressures reaching such a value as to cause hazardous leakage.

BRIEF DESCRIPTION OF THE DRAWINGS

The aforementioned objects and advantages of the invention will be appreciated from the following description and accompanying drawings wherein.

DESCRIPTION OF THE PREFERRED EMBODIMENT

Figure 3:
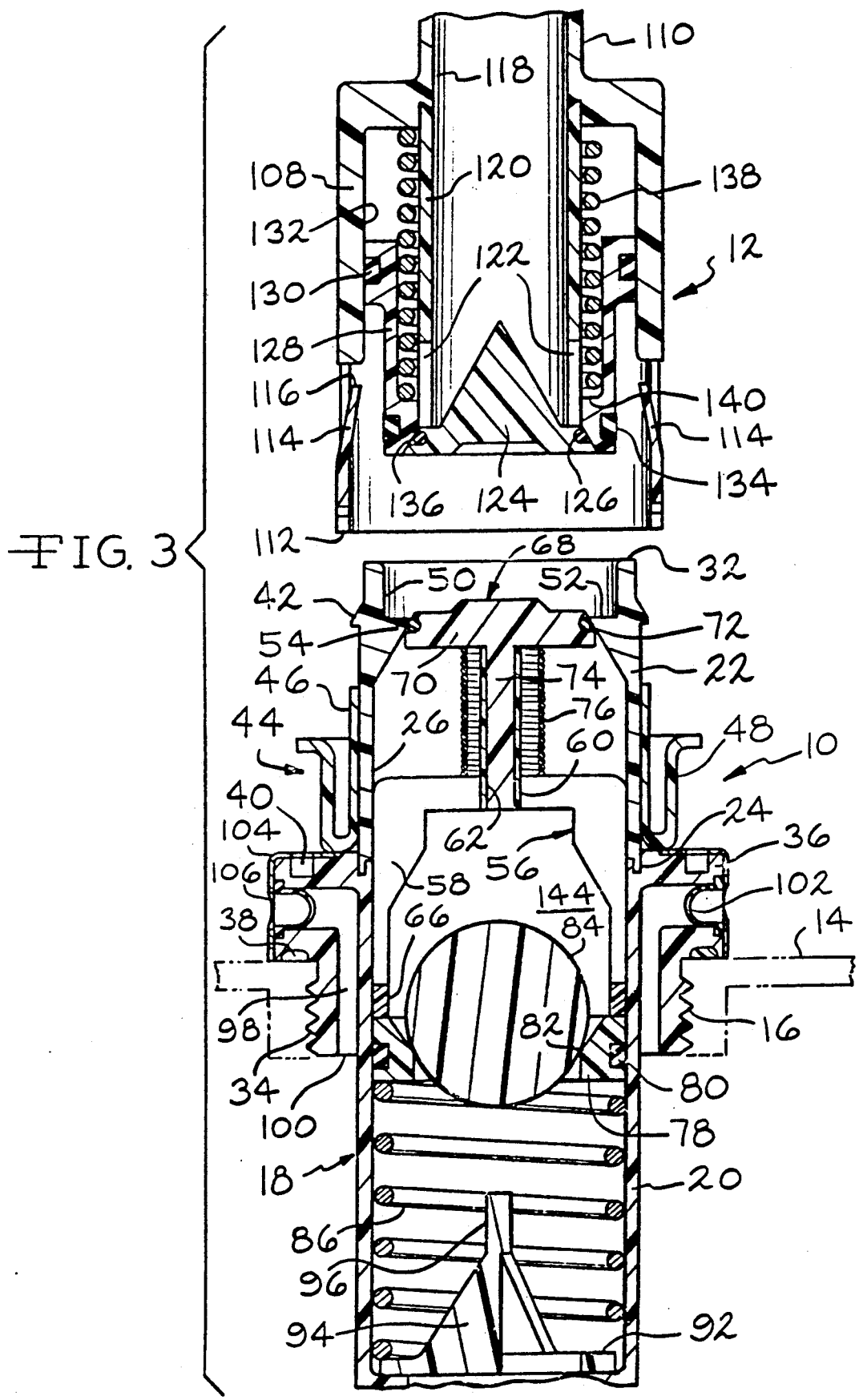
FIG. 3 is an elevational diametrical sectional view of the primary coupling part and the consumer coupling part, as aligned, and prior to interconnection.

A no-spill fluid security coupling in accord with the invention basically consists of a primary part 10 and a secondary part 12, FIG. 3. As will be later explained, two versions of secondary parts are employed in the practice of the invention, and as the secondary part 12 disclosed in FIGS. 3 and 4 is of the "consumer" type the initial explanation of the secondary part will be with respect to the consumer version.

The form of the primary part 10 illustrated in the figures is that used with a closed receptacle or drum in which fluid chemicals may be stored and shipped. It is also to be understood that the primary part 10 may be incorporated into the end of a hose or other conduit into which unauthorized entry is not desired, and the inventive concepts will be applicable to this type of installation as will be readily understood. However, in most instances, the part 10 will be mounted in a vertical orientation on the upper wall of a receptacle, drum or the like, generally indicated at 14, and the receptacle includes a threaded port or bung hole 16 into which the part may be threaded as described below.

The primary part 10 includes a two piece body 18 having an annular lower section 20 and an annular upper section 22. The sections are permanently joined at joint 24 after the internal components are assembled therein. It is to be appreciated that the basic components of both the primary and the secondary coupling parts may be formed of a synthetic plastic material, as illustrated, and such material has the advantage of being economical, non-corrosive, and a material composition is employed which is relatively inert as to not react with corrosive fluids. Metal components such as springs, are preferably formed of stainless steel, or plated, so as not to deteriorate, from exposure to strong chemicals. Of course, the coupling components may also be formed of metal or other materials compatible with the fluids being handled.

Figure 4:
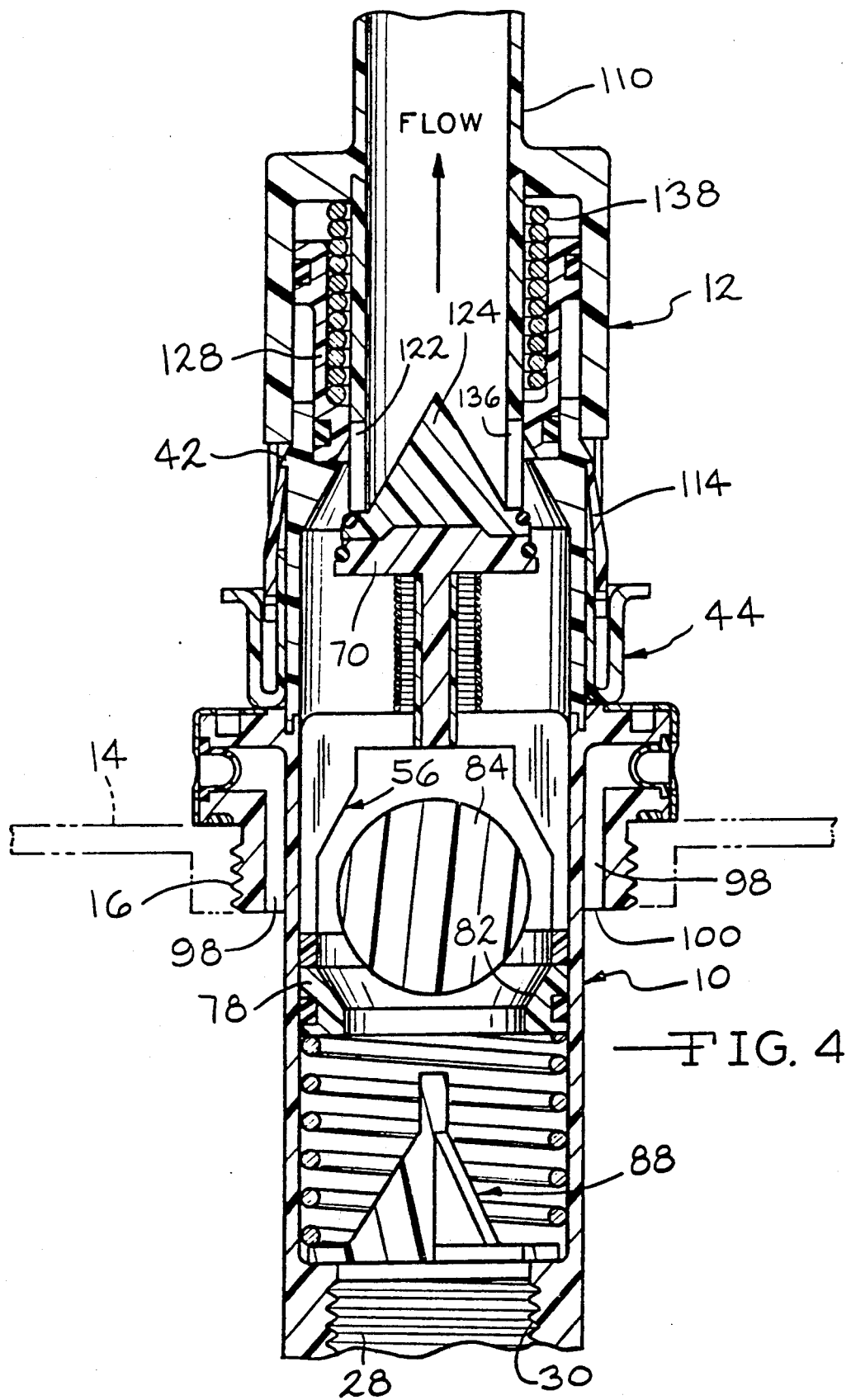
FIG. 4 is an elevational sectional diametrical view illustrating the components of FIG. 3 as fully interconnected, the valves being opened and in the position during unidirectional fluid flow upwardly.

The body 18 includes a passage 26 having a vertically oriented axis and the lower end of the passage as indicated at 28, FIG. 4, is preferably formed with a thread 30 whereby a standpipe may be threaded therein for extending to the bottom of the container to insure that the container is substantially emptied during use. At its other end, the body 18 is provided with an interconnectable outlet end 32, constituting the uppermost portion of the primary coupling part.

Intermediate its upper and lower ends the body 18 is provided with the threads 34 which mate with the threads 16 defined in the receptacle permitting the primary part to be firmly and seatingly threaded into the port 16, and radially extending shoulder 36 includes an annular groove for receiving elastomeric seal 38 to bear against the upper wall 14 and further seal the body 18 to the receptacle. Spanner holes 40 may be defined in the shoulder 36 for receiving a spanner wrench to permit the body 18 to be tightly threaded into port 16.

Adjacent the outlet end 32 an annular cam shoulder 42 is defined on the body 18, and inwardly thereof the release sleeve generally indicated at 44 is axially displaceably supported upon the body cylindrical surface. The release sleeve 44 includes an annular plunger portion 46 disposed adjacent the body cylindrical surface and a handle and rib portion 48 permits the release sleeve to be readily manually shifted along the body.

Adjacent the outlet end 32 the body is formed with a coaxial cylindrical socket 50 radially defined by the shoulder 52, and the shoulder forms an oblique inner valve seat 54 for cooperation with the valve head, as later described.

Figure 1:
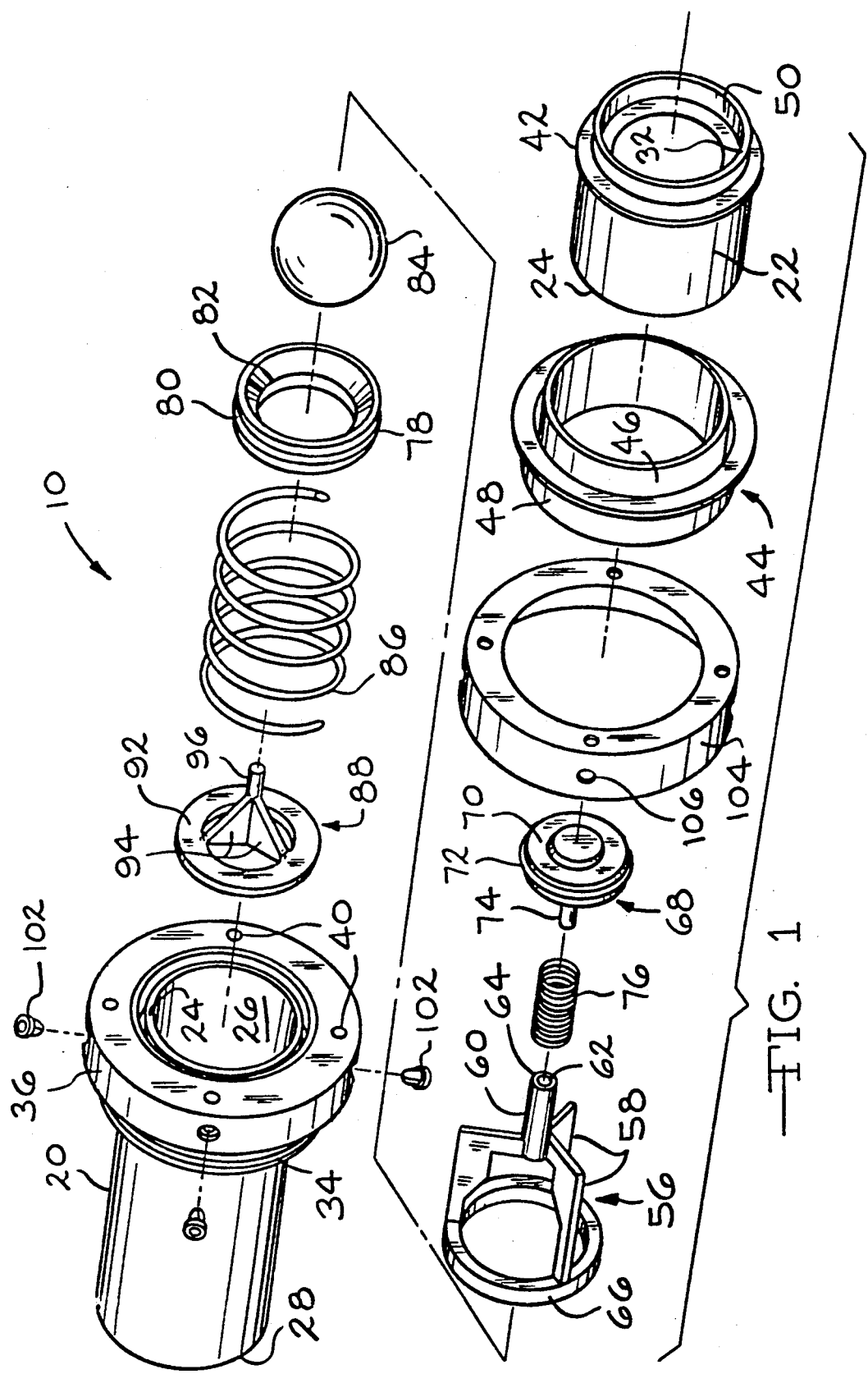
FIG. 1 is a perspective exploded view of the components constituting the primary coupling part in accord with the invention.
Figure 2:
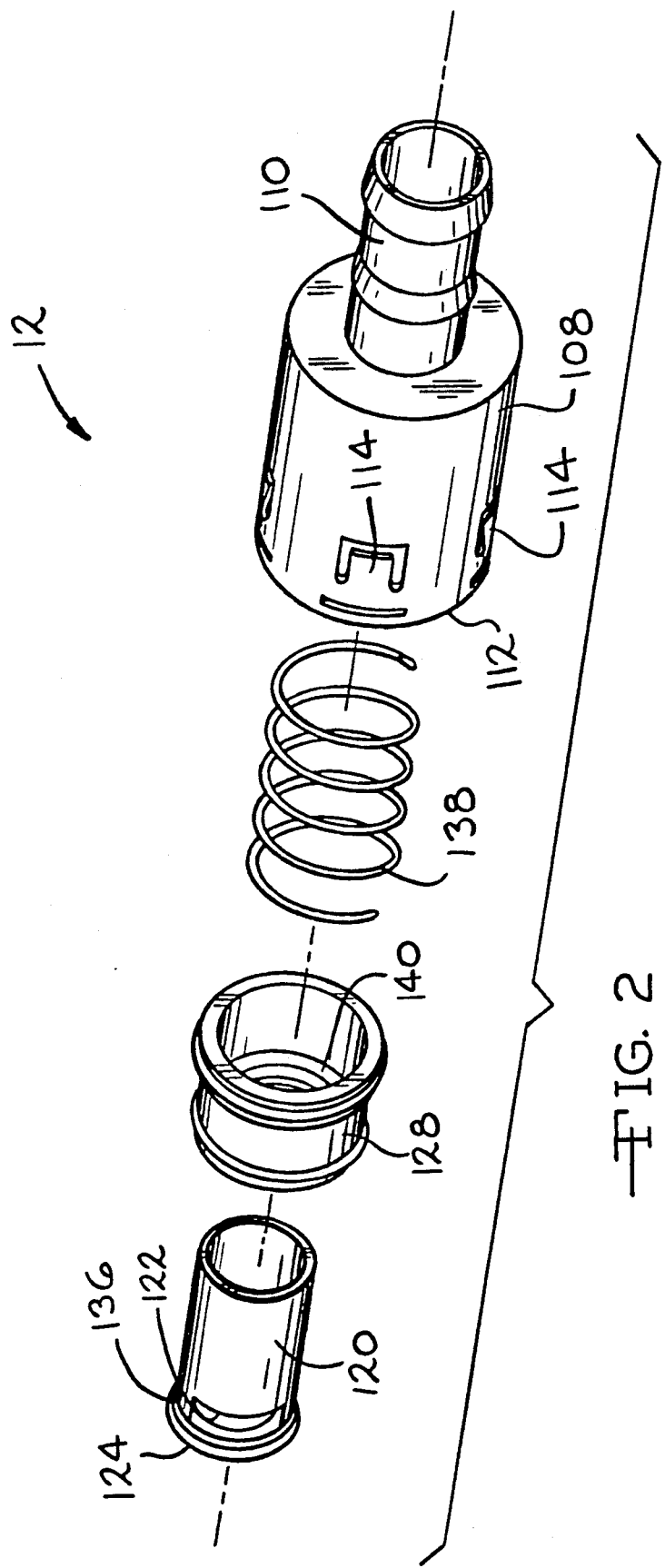
FIG. 2 is a perspective exploded view of the components of a secondary coupling part in accord with the concept of the invention.

Internally a cage 56 is axially displaceably supported within the passage 26. The configuration of the cage 56 is best appreciated from FIG. 1 and includes three spiders 58 supporting a coaxial stem 60 having an axial bore 62 intersecting the upper stem end 64. The cage includes a homogeneous ring 66 located at the lower ends of the spiders 58.

The "no-spill" valve generally indicated at 68 includes a circular valve head 70 having an annular elastomeric seal ring 72 which engages the valve seat 54 under normal conditions. The valve 68 also includes an axially extending cylindrical tang 74 which is slidably received within the cage stem bore 62, and a compression spring 76 interposed between the valve head 70 and the cage 56 axially biases the valve head 70 away from spider 58.

An annular piston 78 is sealingly received within the passage 26 for axial displacement therein and is sealed thereto by the elastomeric seal 80. The piston 78 includes the conical valve seat 82 adapted to cooperate with the spherical ball 84 wherein the valve seat 82 and ball 84 constitute a typical gravity operated check valve which permits upward fluid flow as viewed in FIG. 3, but prevents fluid flow through the part 10 in a downward direction.

The piston 78 is biased upwardly by a compression spring 86 which bears against the abutment structure generally indicated at 88. A radial shoulder 90 defined in the passage 26 supports the abutment 88 engaging the abutment base 92, and the abutment includes a spider 94 and an upwardly extending coaxial rest 96. The configuration of the abutment is best appreciated from FIG. 1.

A plurality of vent passages 98 are defined in the shoulder 36 having a lower end 100 which communicates with the interior of the receptacle, and check valves 102 are located at the upper portions of the vent passages in communication with the atmosphere wherein elastomeric check valves 102 will permit atmospheric air to enter the vent passages 98 as the drum contents are depleted. The check valves 102 include slits which will prevent fluid within the drum escaping through the check valves in the event the drum is not vertically oriented and the vent passages 98 are filled with the drum fluid.

An annular retainer 104 mounted upon the shoulder 36 maintains the check valves 102 within their associated vent passages and retainer openings 106 align with the check valves to permit the desired venting. The retainer 104 also extends over the radial portion of the body shoulder 36 including the spanner holes 40 and openings are defined in the retainer permitting the spanner wrench studs to be received within the holes 40.

The consumer secondary coupling part 12 includes a body 108 having a conduit attachment end 110 whereby a conduit, such as a hose or the like, not shown, may be affixed thereto in communication with the part 12. The body 108 includes an interconnectable end 112 adapted to be placed over the interconnectable end 32 of part 10, and the body 18 includes a plurality of circumferentially spaced cantilevered free ends which normally extend inwardly as shown in FIG. 3. The fingers 114 include ends 116 which will cooperate with the cam shoulder 42 as later described.

The passage 118 of the body 108 is primarily defined by the annular neck 120 integrally and fixedly mounted within the body 108. The neck 120, at its outer portion, includes a plurality of radial ports 122, and the end of the neck 120 is closed by the head 124 having an annular seal 126 defined thereon.

A valve sleeve 128 is axially displaceably supported within the body 108 and includes an outer seal 130 sealingly engaging the body inner cylindrical surface 132. A smaller elastomeric seal 134 is mounted upon the valve sleeve 128 for sealingly cooperating with the primary part socket 50 when the coupling parts are interconnected in order to achieve a fluid tight seal between the parts. Valve sleeve 128 also includes a coaxial valve seat 134 and compression spring 138 interposed between the valve sleeve shoulder 140 and the body 108 biases the valve sleeve downwardly engaging the valve seat 136 and seal 126 to seal the passage 118.

When the primary part 10 is located within the receptacle port 16 as shown in FIG. 3 the ball 84 will be engaging the valve seat 82, and as the spring 86 is considerably stronger than the spring 76 the valve head 70 will be engaging the valve seat 54 and upward fluid flow through the coupling part 10 is prevented.

Assuming the receptacle 14 to have fluid therein to be dispensed, the consumer aligns the secondary part 12 with the part 10 as shown in FIG. 3 and merely pushes the part 12 downwardly over the end 32. As such action occurs the nose of the valve sleeve 128 will enter the socket 50 establishing a fluid tight relationship between the parts 10 and 12. Engagement of the valve sleeve 128 with the shoulder 152 prevents further relative displacement between the valve sleeve and primary part 10 and continued axial displacement of the part 12 causes the neck 120 to move into the part 10 until the outer surface of the head 124 engages the complementary outer surface of the valve head 70. This action displaces the valve head 70 downwardly away from the valve seat 54 and fluid within the drum 14 may now flow upwardly through part 10 into part 12 as fluid may now flow around the valve head 70 and into the passage 118 through the ports 122. FIG. 4 illustrates the fully interconnected relationship of the parts 10 and 12 wherein the fingers 114 have passed over the cam shoulder 142 and the finger end 116 have snapped over the cam shoulder and engage the radial portion thereof preventing axial removal of the part 12 from the part 10.

As apparent from FIG. 4, the upward movement of fluid through the parts 10 and 12 will lift the ball 84 from the valve seat 82 and dispensing of the fluid within the drum 14 into the consumer's secondary coupling part 12 continues unrestricted. When the consumer desires to remove the coupling part 12 from part 10 the release sleeve 14 is grasped and moved upwardly. This action causes the annular plunger 46, which is located "under" the fingers 114, to lift the fingers disengaging finger ends 116 from the cam shoulder 42 and the coupling part 12 may be lifted from the part 10.

As the coupling parts are separated valve head 70 will engage valve seat 54 as head 124 is withdrawn, and valve sleeve 128 will engage the head 124 to seal part 12. As fluid flow through the part 10 has ceased the ball 84 will drop into engagement with the valve seat 82 as shown in FIG. 3.

If, for any reason, the consumer attempted to reverse the flow of fluid from part 12 into part 10 so that the fluid would flow from coupling part 12 to part 10, downwardly, entrance of fluid into the coupling part 10, and into the receptacle 14, is prevented by the check valve 82–84. Thus, reverse flow of fluid through the part 10 is prevented by the valve seat 82 and ball 84, and to overcome this safety feature it would be necessary for the consumer to use a sufficiently high pressurized fluid to displace the piston 78 downwardly to cause the abutment 88 to unseat the ball 84 as described below with respect to FIG. 6. Such pressurization of fluid by the consumer is unlikely, and the aforedescribed coupling structure provides a security against bidirectional flow through the part 10 as described.

Figure 5:
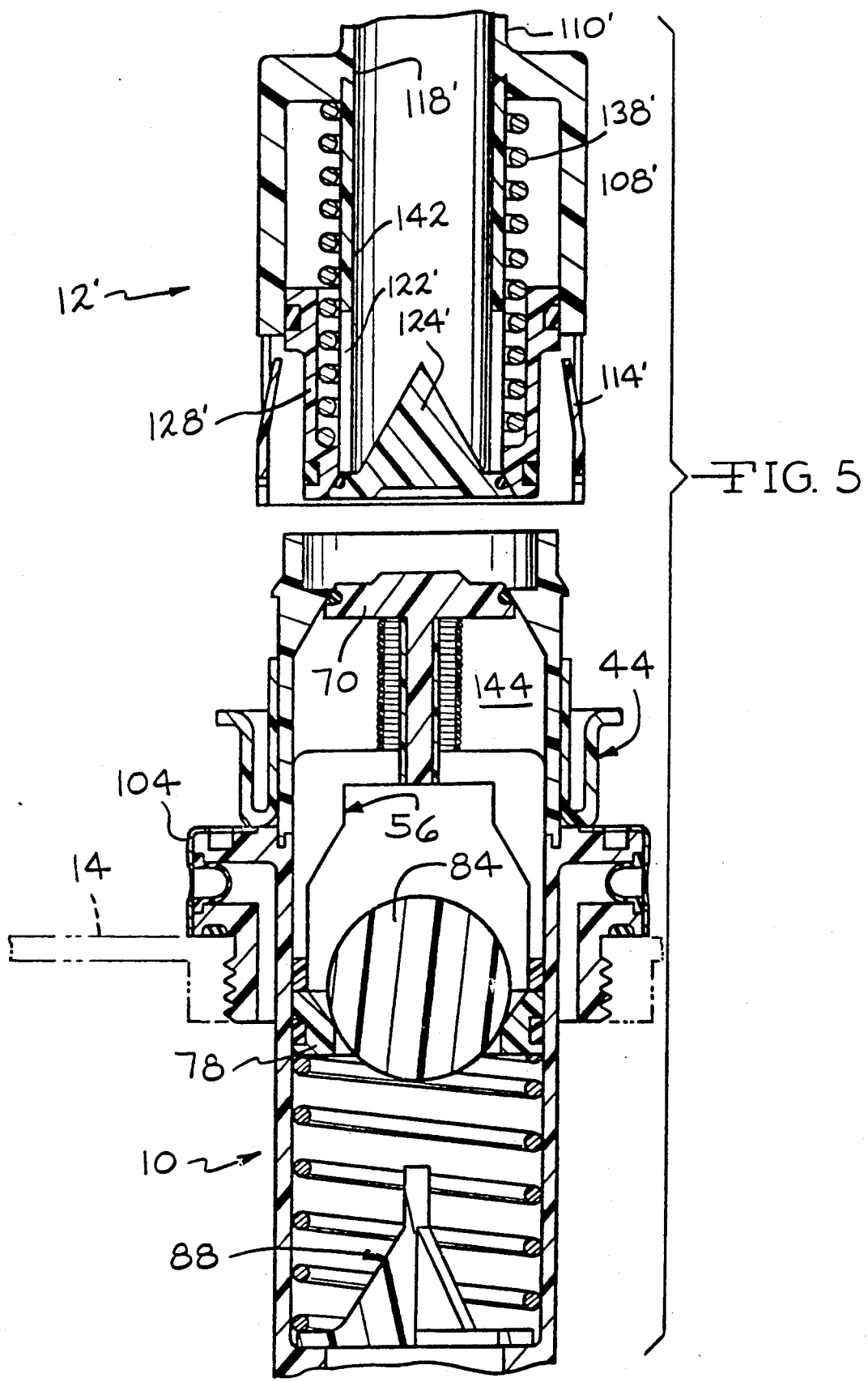
FIG. 5 is an elevational diametrical sectional view of the primary coupling part and the authorized secondary coupling part which permits bidirectional fluid flow through the primary coupling part, and prior to the parts being interconnected.
Figure 6:
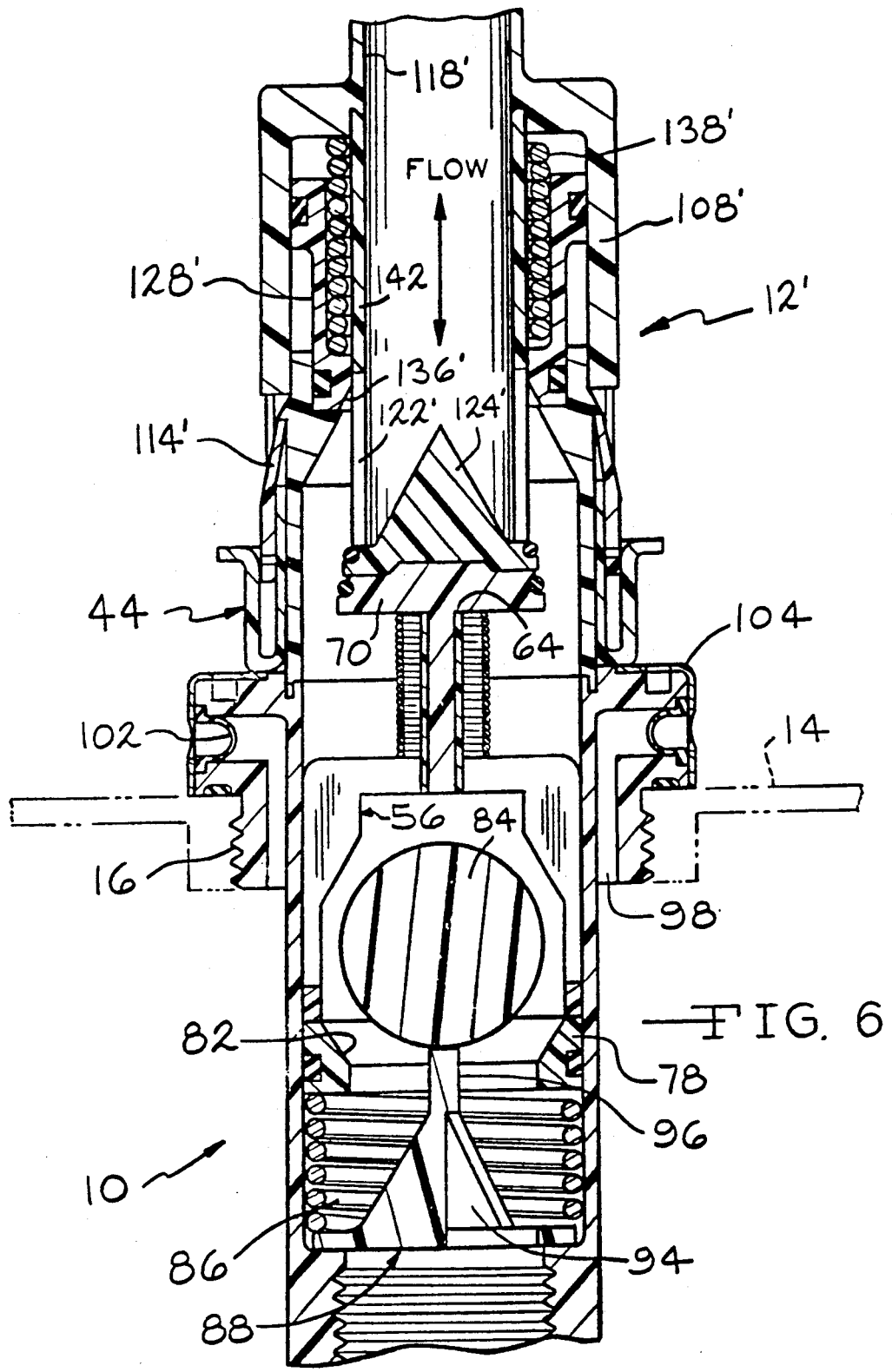
FIG. 6 is an elevational diametrical sectional view of the coupling parts of FIG. 5 as shown in the fully interconnected condition, the check valve being rendered inoperative, and the fluid flow being bidirectional.

If it is desired to refill the receptacle 14 by authorized personnel, such as the dealer for the liquid chemical being sold, the dealer uses a refill secondary coupling part of the type shown in FIGS. 5 and 6. In FIGS. 5 and 6 all of the components identical to those previously described are indicated by primed reference numerals with respect to the secondary part 12'. Of course, the part 10 remains the same under all conditions of operation.

The authorized or dealer version of the secondary part 12' is identical to the consumer part 12 previously described except that the neck 142 is of a longer axial length than the neck 120.

The result of the longer axial length of the neck 142 is that as the parts 10 and 12' are being interconnected the axial displacement of the valve head 70 against the cage stem end 64 displaces the cage 56 downwardly causing the cage ring 66 to engage the piston 78 displacing the piston 78 downwardly therewith. This downward movement of the check valve structure continues under the axial force being imposed on the cage by the greater length of the neck 142 and the end of the abutment rest 96 will engage the ball and unseat the ball from the valve seat 82 as shown in FIG. 6. Under these conditions the check valve formed by the valve seat 82 and the ball 84 is rendered inoperative and fluid flow downwardly through the primary part 10 may now occur as all of the valves of the coupling are open. In this manner the dealer may refill the receptacle 14.

Uncoupling of the part 12' from the part 10 is identical to that described above with respect to secondary part 12. As the part 12' is lifted from the part 10 the spring 86 will raise the piston 78 into engagement with the ball 84 rendering the check valve structure operative and the accompanying parts 10 and 12' will be separated as described above.

Due to the sealing of the valve 68 and the check valve 82-84 within the primary coupling part 10 it is possible for fluid to be trapped within the chamber 144 between the ball 84 and the valve head 70. Under normal conditions this entrapped fluid creates no problems. However, if the coupling part 10 is in the sun, or moved to a relatively warm environment, the fluid within chamber 144 will become heated and endeavor to expand. Unless the pressure of this entrapped fluid is relieved, the pressure may cause leakage pass the valve head 70 into the atmosphere and the area surrounding the body 18. However, the construction of the check valve within coupling part 10 prevents such leakage. As the pressure within chamber 144 increases the fluid pressure imposed upon the ball 84 and the piston 78 in a downwardly direction will cause the piston 78 to move downwardly until the abutment rest 96 engages the ball 84 lifting the ball from the valve seat 82 and permitting the entrapped fluid to flow downwardly into the receptacle 14.

Figure 7:
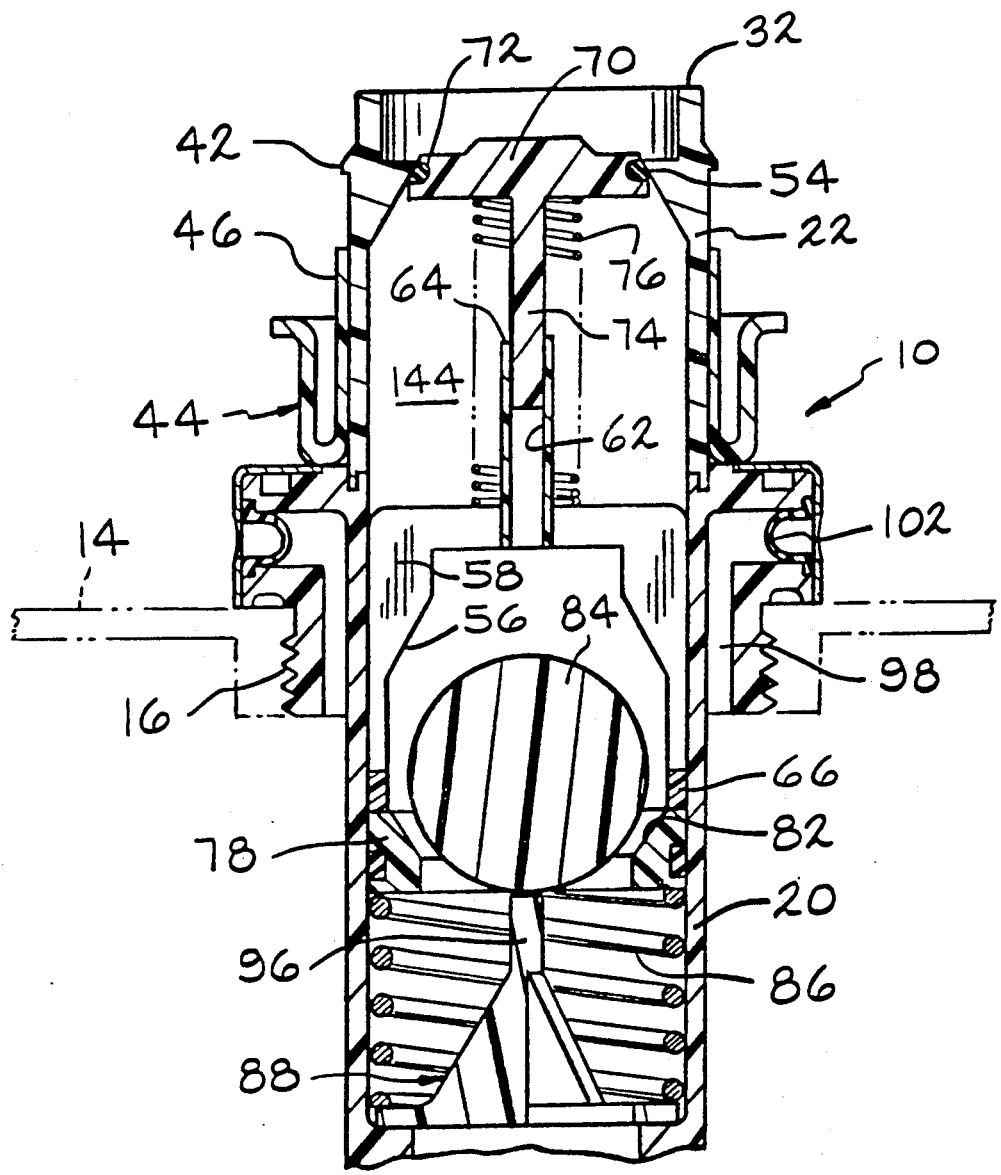
FIG. 7 is a diametrical elevational sectional view of the primary coupling part, per se, the valve components being shown in the position for relieving pressure within fluid located within the coupling part.

As will be appreciated from FIG. 7, under these conditions the spring 76 extends disengaging cage end 64 from valve head 70 maintaining the sealing of the valve 68 preventing spillage, and upon the pressure being relieved the piston 78 and valve seat 82 will rise into engagement with the ball 84 restoring the normal arrangement as shown in FIG. 3.

As the valve 68 is located adjacent the coupling part outlet end 32, and in view of the close complementary engagement of the valve and nose components of the coupling parts, spillage into the atmosphere or adjacent the coupling part 10 from the receptacle 14 is eliminated, and this "no-spill" aspect of the invention is significant from the environmental aspect.

The selective use of the consumer secondary coupling part 12 or the authorized dealer coupling part 12' provides an inexpensive foolproof security operation of the coupling to substantially eliminate the possibility of injecting improper fluids into the receptacle 14, and the automatic operation of the coupling parts 12 and 12' eliminates the need for the operator to pay special attention to the type of secondary coupling part being used.

Unauthorized persons will not have access to the secondary coupling part 12' having the elongated neck 142, and if authorized personnel endeavor to refill the receptacle 14 with a consumer's coupling part 12 the operator will immediately be aware that refilling is not occurring and will employ the proper coupling part 12'.

It is appreciated that various modifications to the inventive concepts may be apparent to those skilled in the art without departing from the spirit and scope of the invention.

We claim:

1. A fluid coupling characterized by its ability to limit bidirectional fluid flow to authorized use comprising, in combination, first and second interconnectable coupling parts each having an axial passage and an interconnectable end, releasable complementary connection means defined upon said coupling parts adapted to interconnect upon said parts, interconnectable ends being coaxially aligned and interfitted in a fluid transfer relationship, a first valve movably mounted within said first coupling part passage having a closed position preventing fluid flow through said first part passage in a first direction toward said first part interconnectable end, a check valve movably mounted within said first coupling part passage axially spaced inwardly from said first valve and said first part interconnectable end limiting fluid flow through said first part passage to said first direction, check valve release means mounted within said first part passage selectively rendering said check valve inoperative to permit fluid flow therethrough in a second direction opposite to said first direction, and a check valve release means operator selectively defined on said second coupling part whereby only a second coupling part having a check valve release means operator will permit bidirectional fluid flow through said first coupling part.

2. In a fluid coupling as in claim 1, wherein said first valve is located within said first coupling part passage adjacent said first part interconnectable end rendering said coupling first part spillproof.

3. In a fluid coupling as in claim 1, a spring within said coupling first part passage biasing said first valve toward said closed position.

4. In a fluid coupling as in claim 1, said check valve including a ball engaging an annular seat located within said first coupling part passage, said ball engaging said seat upon fluid attempting to flow in said second direction, and said release means comprising a ball engaging member within said first part passage adapted to selectively disengage said ball from said seat to permit fluid flow in said second direction.

5. A fluid coupling characterized by its ability to limit bidirectional fluid flow to authorized use comprising, in combination, first and second interconnectable coupling parts each having an axial passage and an interconnectable end, releasable complementary connection means defined upon said coupling parts adapted to interconnect upon said parts' interconnectable ends being coaxially aligned and interfitted in a fluid transfer relationship, a first valve movably mounted within said first coupling part passage having a closed position preventing fluid flow through said first part passage in a first direction toward said first part interconnectable end, a check valve movably mounted within said first coupling part passage axially spaced inwardly from said first valve and said first part interconnectable end limiting fluid flow through said first part passage to said first direction, check valve release means mounted within said first part passage selectively rendering said check valve inoperative to permit fluid flow therethrough in a second direction opposite to said first direction, and a check valve release means operator selectively defined on said second coupling part whereby only a second coupling part having a check valve release means operator will permit bi-directional fluid flow through said first coupling part, said check valve including a ball engaging an annular seat located within said first coupling part passage, said ball engaging said seat upon fluid attempting to flow in said second direction, and said release means comprising a ball engaging member within said first part passage adapted to selectively disengage said ball from said seat to permit fluid flow in said second direction, a cage and a valve seat within said first part passage axially movable between a first position toward said first part interconnectable end and a second position remote from said first part interconnectable end adjacent said ball engaging member, said ball being defined within said cage, a spring biasing said valve seat towards its first position, said ball engaging member engaging and unseating said ball at said cage second position, said second coupling part check valve release means operator comprising an axially extending probe operatively axially displacing said cage and valve seat from their first position to their second position upon said first and second parts being interconnected.

6. A fluid coupling characterized by its ability to limit bidirectional fluid flow to authorized use comprising, in combination, first and second interconnectable coupling parts each having an axial passage and an interconnectable end, releasable complementary connection means defined upon said coupling parts adapted to interconnect upon said parts' interconnectable ends being coaxially aligned and interfitted in a fluid transfer relationship, a first valve movably mounted within said first coupling part valve located at said first part interconnectable end having a closed position preventing fluid flow through said first part passage in a first direction toward said first part interconnectable end, a first spring within said first part passage biasing said first valve toward said closed position, a normally unidirectional second valve located within said first part passage axially spaced inwardly from said first valve preventing fluid flow within said first part in a second direction opposite to said first direction, release means located within said first part passage adapted to selectively operate said second valve to permit fluid flow therethrough in said second direction, a first valve operator mounted on said second part opening said first valve upon said first and second parts being interconnected, and a second valve release means operator selectively defined on said second coupling part whereby only a second coupling having a second valve release means operator will permit fluid flow in said second direction through said second valve.

7. In a fluid coupling as in claim 6, said first valve comprising a poppet valve.

8. In a fluid coupling as in claim 6, said first part adapted to be substantially vertically oriented with its interconnectable end extending upwardly, said second valve comprising a ball within said first part passage and an annular valve seat located below said ball, said release means being located below said ball adapted to engage and unseat said ball under control of said operator.

9. In a fluid coupling as in claim 8, a cage and valve seat within said first part passage axially movable between a first position toward said first part interconnectable end and a second position remote from said first part interconnectable end adjacent said ball engaging member, said ball being located within said cage, said valve seat being defined adjacent said cage, a spring biasing said cage and valve seat towards its first position, said ball engaging member engaging and unseating said ball at said cage second position, said second coupling part check valve release means operator comprising an axially extending probe operatively axially displacing said cage from its first position to its second position upon said first and second parts being interconnected.

10. A fluid coupling system characterized by its ability to limit bidirectional fluid flow to authorized use, comprising, in combination, a primary coupling part, first and second secondary coupling parts, each coupling part having an axis, an axially extending passage, and an interconnectable end whereby said primary part may be selectively connected to said secondary parts, releasable complementary latch means defined upon said primary part and said secondary parts whereby said primary part may be latched to the selected secondary part in fluid tight communication therewith, a first valve located in said primary part passage adjacent said primary part interconnectable end movable between passage open and closed positions, a spring biasing said first valve toward said closed position preventing spillage from said primary part, a second normally unidirectional flow valve within said primary part passage permitting fluid flow in a first direction toward said primary part interconnectable end and normally preventing fluid flow in a second direction opposite to said first direction, second valve release means within said primary part passage operably associated with said second valve to selectively permit fluid flow through said second valve in said second direction, first valve operating means defined on said first and second secondary parts engaging said first valve upon connection to said primary part permitting flow in said first direction between the interconnectable parts and a second valve operator defined on said second secondary part operatively associating with said second valve release means upon said second secondary part being interconnected to said primary part to permit flow from said second secondary part through said primary part in said second direction.

11. In a fluid coupling system as in claim 10, said second valve including a check valve having a movable valve element selectively engaging a valve seat.

12. In a fluid coupling system as in claim 11, said valve element comprising a ball and said second valve release means including a ball engaging member defined in said primary part passage separating said ball from said valve seat upon said second secondary part operator actuating said release means.

13. In a fluid coupling system as in claim 12, a cage and valve seat axially movable within said primary part passage, said ball being axially movably mounted in said cage, said valve seat being adjacent said cage, a spring axially biasing said cage and valve seat in said first direction toward said primary part interconnectable end, said ball engaging member comprising an abutment defined in said primary part passage engaging and unseating said ball upon predetermined axial movement of said cage and valve seat in said second direction, said second valve operator comprising an axially extending probe defined on said second secondary part.

14. In a fluid coupling system as in claim 13, said first valve operating means comprising an annular probe engageable with said first valve to axially displace and open said first valve upon interconnection of said primary and secondary parts and said second valve operator defined on said second secondary part comprising an extension of said probe, said first valve being mounted on said cage whereby predetermined axial movement of said first valve axially displaces said cage and valve seat to cause said ball to be engaged and unseated by said abutment.

15. A fluid coupling for fluid containers characterized by its closed circuit confinement of expanding fluids located within the coupling wherein the coupling communicates with a port formed in the container comprising, in combination, an elongated coupling part having an axially extending passage adapted to communicate with the container port, said part including outer and inner ends intersecting said passage constituting an outlet and an inlet, respectively, a first seat defined on said part adjacent said outlet, a first valve within said passage selectively engaging said seat preventing fluid within said passage from discharging form said outlet, a unidirectional valve defined in said part passage axially spaced from said outlet end first valve seat preventing fluid flow from said outlet to said inlet, a chamber defined in said passage intermediate and in communication with said first valve and said unidirectional valve, and pressure relief means within said passage selectively establishing communication between said chamber and said part inlet whereby upon the pressure of fluid within said chamber reaching a predetermined value said chamber will communicate with said inlet relieving such pressure and permitting the pressurized fluid to flow into the container.

16. In a coupling for containers as in claim 15, said unidirectional valve comprising a check valve.

17. In a coupling for containers as in claim 16, said check valve including an annular second valve seat coaxially related to said part passage and a ball normally engaging said second valve seat, said pressure relief means unseating said ball from said second seat upon the pressure of fluid within said chamber attaining said predetermined value.

18. A fluid coupling for fluid containers characterized by its closed circuit confinement of expanding fluids located within the coupling wherein the coupling communicates with a port formed in the container comprising, in combination, an elongated coupling part having an axially extending passage adapted to communicate with the container port, said part including outer and inner ends intersecting said passage constituting an outlet and an inlet, respectively, a first seat defined on said part adjacent said outlet, a first valve within said passage selectively engaging said seat preventing fluid within said passage from discharging from said outlet, a unidirectional valve defined in said part passage axially spaced from said outlet end first valve seat preventing fluid flow from said outlet to said inlet, a chamber defined in said passage intermediate said first valve and said unidirectional valve, and pressure relief means within said passage selectively establishing communication between said chamber and said part inlet whereby upon the pressure of fluid within said chamber reaching a predetermined value said chamber will communicate with said inlet relieving such pressure and permitting the pressurized fluid to flow into the container, said unidirectional valve comprising a check valve, said check valve including an annular second valve seat coaxially related to said part passage and a ball normally engaging said second valve seat, said pressure relief means unseating said ball from said second seat upon the pressure of fluid within said chamber attaining said predetermined value, a cage within said part passage in sealed relation thereto and axially displaceable therein between first and second positions, said ball being located within said cage, said second valve seat being defined adjacent said cage and movable therewith, said pressure relief means including an abutment located within said part passage engaging and unseating said ball from said second valve seat upon said cage and valve seat being displaced from said first position to said second position, and a spring biasing said cage and second valve seat toward said first position, said second valve seat constituting an axially displaceable piston within said passage axially displaceable against said spring to said second position by fluid pressure within said chamber, unseating of said ball permitting said chamber to communicate with said passage inlet.

19. In a coupling for containers as in claim 15, the container comprising a closed container having an upper wall, the port being defined in the upper wall, said coupling part being sealingly received within the port whereby said part inlet is in communication with the interior of the container, and vent means defined in said coupling part selectively establishing communication between the container interior and atmosphere.

20. In a coupling for containers as in claim 19, unidirectional valve means within said vent means limiting venting from the atmosphere to the interior of the container.

21. A fluid coupling comprising first and second interconnectable coupling parts each having an axial passage and an interconnectable and releasable complementary connection means defined upon said coupling parts adapted to interconnect said parts in a fluid transfer relationship, first valve means movably mounted within said first coupling part passage having an open and closed position whereby fluid may be selectively restricted from flowing through said first part passage in a first direction toward said second part, check valve means positioned within said first coupling part passage spaced inwardly from said first valve means thereby preventing fluid flow through said first part passage in a second direction opposite to said first direction, first valve operator means within said second coupling part whereby interconnection of said parts' engages said first valve operator means thereby opening said first valve to permit fluid flow through said parts' passages in said first direction.

22. The fluid coupling as claimed in claim 21, including check valve release means defined on said second coupling part whereby said check valve release means renders said check valve means inoperative in the open position, thereby permitting fluid flow in both said first and second directions.

23. In a fluid coupling as claimed in claim 22, wherein said check valve release means includes an extension defined upon said first valve operator means.

24. In a fluid coupling as claimed in claim 22, said check valve means including a ball engaging an annular seat located within said first coupling part passage, said ball engaging said seat upon fluid flow in said second direction, and said check valve release means including a ball engaging member within said first part passage adapted to selectively disengage said ball from said seat thereby permitting fluid flow in said second direction.

25. In a fluid coupling as claimed in claim 24, a cage within said first coupling part passage axially movable between a first position toward said second part and a second position remote from said second part adjacent said ball engaging member, said ball being located within said cage, said valve seat being axially displaceable within said first coupling part passage, a spring biasing said valve seat towards said cage first position, said ball engaging member engaging and unseating said ball at said cage second position, said second coupling part check valve release means including an axially extending probe operatively displacing said cage and valve seat from said first position to said second position upon said first and second parts being interconnected.

26. A fluid discharge coupling part for use on a fluid storage container characterized by its ability to limit bidirectional fluid flow to authorized use comprising, a body having an axial passage and an interconnectable end external to the storage container, releasable connection means defined upon said interconnectable end, whereby discharge means may be releasably connected thereto for withdrawing fluid from the container, first valve means mounted within said coupling part body passage adjacent said interconnectable end having a normally closed position thereby preventing fluid flow through said passage in a first direction outward from the storage container, check valve means inwardly positioned from said first valve means and having an operative position whereby fluid may be withdrawn from the storage container and an inoperative position preventing fluid flow into the storage container, check valve means release means within said passage selectively moving said check valve means to said inoperative position, said check valve means including a ball engaging an annular seat located within said passage, said ball engaging said seat when said check valve means is in said operative position, and said release means comprising a ball engaging member within said passage adapted to disengage said ball from said seat when said check valve is in said inoperative position.

27. In a fluid discharge coupling part as claimed in claim 26, said check valve means including a cage within said passage axially movable between a first position when said check valve means is in said operative position, and a second position remote from said interconnectable end when said check valve means is in said inoperative position, said check valve ball being located within said cage, said valve seat being axially displaceable within said body passage, a spring biasing said valve seat toward said cage first position, said ball engaging member engaging and unseating said ball at said cage second position.

28. A fluid connect coupling part for use with a fluid discharge coupling part having an axial passage, a connect coupling part connection end, releasable connect coupling connection means adjacent the connection end, an axially displaceable first valve within the passage adjacent the connection end positionable between open and closed positions, a unidirectional second valve within the passage inwardly of the connection end and first valve normally restricting fluid flow to a first direction from the connection end, unidirectional valve operative means within the passage adapted to selectively operate the unidirectional valve to permit fluid flow in a second direction into the connection end, the fluid connect coupling part comprising an annular body having an axial passage, a discharge coupling part engagement end defined on said body, releasable attachment means defined on said body adapted to selectively cooperate with the discharge coupling part connection means, discharge coupling part first valve operating means defined on said body engagement end, and a valve within said body passage selectively operable between open and closed positions to control fluid flow through said body passage, upon connection of the coupling parts said valve engaging the discharge coupling part end moving said valve to said open position and said valve operating means engaging the discharge coupling part first valve to position the first valve to its open position.

29. In a fluid connect coupling as in claim 28, said discharge coupling part first valve operating means comprising an axially extending probe defined on said body extending from said body engagement end.

30. In a fluid connect coupling as in claim 29, said valve within said body passage being mounted upon said probe.

31. In a fluid connect coupling as in claim 30, said probe comprising a tubular member having a wall and in communication with said body passage, a port defined in said tubular member wall, said valve including an annular sleeve axially displaceable upon said probe adapted to close said port at said valve closed position.

32. In a fluid connect coupling as in claim 28, discharge coupling part second valve operating means defined on said body engagement end adapted to engage and operate the discharge coupling part unidirectional valve operative means upon connection of the coupling parts to permit fluid flow in the second direction.

33. In a fluid connect coupling as in claim 32, said discharge coupling part first valve operating means comprising an axially extending probe defined on said body extending from said body engagement end, said discharge coupling part second valve operating means comprising an extension defined on said probe.

34. A fluid connect coupling part comprising an annular body having an axis, a concentric passage and a connectable end, coupling connection means defined on said body, a cylindrical tubular extension defined on said body concentric to said axis is communication with said passage and having a closed end extending toward said connectable end, a port defined in said extension adjacent said closed end, an annular valve seat defined on said extension closed end, an annular sleeve valve mounted on said extension for axial displacement thereon having an outer end disposed toward said valve seat for selective engagement therewith to close said passage, an abutment surface defined on said sleeve valve outer end whereby engagement of said abutment surface during connection of said coupling part will disengage said sleeve valve and valve seat permitting fluid flow through said port around said extension closed end, and a spring within said body biasing said sleeve valve toward said valve seat.

35. In a fluid connect coupling part as in claim 34, seals interposed between said sleeve valve and said body, an annular recess defined in sleeve valve adjacent said extension and axially spaced from said sleeve valve outer end, said spring comprising a compression spring encircling said extension and located within said recess.

* * * * *